Patented Sept. 14, 1948

2,449,469

UNITED STATES PATENT OFFICE 2,449,469

PREPARATION OF POLYFORMALS

William F. Gresham, Lindamere, and Richard E. Brooks, Edgemoor Terrace, Del., assignors to E. I. du Pont de Nemours & Company, Wilmington, Del., a corporation of Delaware No Drawing. Application November 2, 1944, Serial No. 561,640

10 Claims. (Cl. 260—615)

This invention relates to polyoxymethylene ethers and to a novel method for preparing the same. In particular the invention is concerned with polyoxymethylene ethers, i. e. polyformals, of the formula $RO(CH_2O)_nR$ in which R is a cycloalkyl, alkyl, or aryl group and $n$ is an integer.

It has been known heretofore that polyoxymethylene dimethyl ethers have been prepared by heating methanol and polymeric formaldehyde in a closed vessel at elevated temperatures (Helv. Chim. Acta 8, 64; Ann 474, 213). In the latter process the chief reaction product was a relatively non-volatile mixture of polyformals containing high molecular weight polyoxymethylene dimethyl ethers, although minor amounts of the low molecular weight polyoxymethylene ethers also were obtained.

An object of this invention is to provide a process for preparing the low molecular weight polyoxymethylene ethers in comparatively high yield. Another object is to provide new polyoxymethylene ethers having a variety of useful properties.

These and other objects are accomplished in accordance with the invention by reacting formaldehyde with dicycloalkyl, dialkyl, or diaryl formals at a temperature within the range of about 20° to 150° C., preferably about 80° to 100° C. in the presence of an acid-reacting catalyst until an equilibrium composition is approached, thereafter making the said equilibrium mixture neutral or alkaline, and separating the low molecular weight polyoxymethylene ethers from the resulting neutral or alkaline mixture. The present invention is particularly effective when employed for the preparation of polyoxymethylene dialkyl ethers of the formula $RO(CH_2O)_nR$, in which $n$ is an integer from 2 to 4 inclusive and R is an alkyl, cycloalkyl, or aryl group, preferably an alkyl group, containing from 1 to 4 carbon atoms.

The reaction by which polyoxymethylene ethers are formed according to the present invention may be written as follows, $n$ and R being defined as above stated.

$$ROCH_2OR + (n-1)HCHO \rightarrow RO(CH_2O)_nR$$

The dialkyl formals which may be employed in accordance with this invention include methylal, diethyl formal, dicyclohexyl formal, diisopropyl formal, di-n-propyl formal, the dibutyl formals, and the like. The formaldehyde reactant, according to the invention, may be monomeric formaldehyde, or formaldehyde in any suitable polymeric form, such as paraformaldehyde, paraformaldehyde hydrate, or trioxane. By far the best results are obtained when polymeric formaldehyde in a substantially anhydrous form is employed, such as paraformaldehyde containing not more than about 2% to 3% water.

The catalysts which may be used in accordance with this invention include acid-reacting substances in general, especially the common inorganic acids, such as sulfuric acid. The amount of acid-reacting catalyst required is generally not more than about 2% of the total weight of the reaction mixture.

For best yields of low molecular weight polyoxymethylene dialkyl ethers (i. e. ethers of the formula $RO(CH_2O)_nR$, in which $n$ is an integer from 2 to 4 and R is an alkyl group containing from 1 to 4 carbon atoms) the initial molar ratio of dialkyl formal to formaldehyde in the reaction mixture should be from about 1:1 to about 10:1. In general the yield of these ethers increases with an increase in the initial molar ratio of dialkyl formal to formaldehyde. When this molar ratio is high, the resulting equilibrium mixture is preferably "frozen" by addition of alkali, prior to distilling the low molecular weight reaction products.

A suitable method for carrying out the invention is to heat paraformaldehyde with an excess of dialkyl formal in the presence of an acidic catalyst, at a temperature of about 80° to 100° C., until an equilibrium mixture is formed. This generally requires a reaction time of not more than a few hours. The resulting mixture, upon treatment with alkali and subsequent distillation, yields the desired polyformals. These polyformals (polyoxymethylene dialkyl ethers having from 2 to 4 formaldehyde units in the chain) are thus obtained in yields as high as about 90% to 95%.

The invention is illustrated further by means of the following examples.

*Example 1.*—Diisobutyl formal (1 mol), paraformaldehyde (0.33 mol), and $H_2SO_4$ (1% by weight) were heated at a temperature of 80° to 100° C. on the steam bath, with stirring, for 2 hours. The resulting mixture was made basic with $NaOCH_3$ in methanol, and distilled, giving a 47% conversion (based on formaldehyde) to diisobutoxymethyl ether, $$i-C_4H_9O(CH_2O)_2i-C_4H_9$$

(B. P. 66°/5 mm.; Refractive Index, 1.4050 at 25° C.), and a 44% conversion to tri-(oxymethylene) diisobutyl ether, $i-C_4H_9O(CH_2O)_3i-C_4H_9$ (B. P. 69°/2 mm.; Refractive Index 1.4082 at 25° C.).

The paraformaldehyde used in this experiment was substantially anhydrous (water content, 0.5%).

*Example 2.*—Diethyl formal (1.8 mols), paraformaldehyde (0.5 mol) and sulfuric acid (0.004 mol) were heated together in a closed vessel at 100° C. for one hour under a pressure of 100 pounds per square inch. The resulting product was made basic with sodium methoxide, and was distilled at diminished pressure, yielding di(oxymethylene) diethyl ether, $C_2H_5O(CH_2O)_2C_2H_5$, (conversion, 43%; B. P. 72°/76 mm.; Refractive Index 1.3868 at 25° C.), and tri(oxymethylene)-diethyl ether, $C_2H_5O(CH_2O)_3C_2H_5$, (conversion, 36%; B. P. 71°/13 mm.; Refractive Index 1.3961 at 25° C.).

*Example 3.*—A mixture of paraformaldehyde (8 mols), methylal-methanol azeotrope (30 mols), and $H_2SO_4$ (0.3 mol) was heated under refluxing conditions for 5.5 hours. A 20% aqueous solution of sodium hydroxide (1.5 mols) was then added, and the refluxing was continued for one hour in order to destroy the excess formaldehyde. The upper layer of the resulting mixture was separated and was thereafter dried with $K_2CO_3$. Distillation of the dried liquid gave dimethoxymethyl ether, $CH_3O(CH_2O)_2CH_3$ (conversion 26.4%; B. P. 104° C.; Refractive Index 1.3768 at 25° C.); tri(oxymethylene)dimethyl ether, $CHO_3(CH_2O)_3CH_3$ (conversion, 14.9%; B. P. 76.3°/51 mm.; Refractive Index 1.3915 at 25° C.); and tetra(oxymethylene)dimethyl ether, $$CH_3O(CH_2O)_4CH_3$$

(conversion 3.2%; B. P. 76.5°/10.5 mm; Refractive Index 1.4018 at 25° C.).

*Example 4.*—A total formaldehyde conversion of 68.6% to $CH_3O(CH_2O)_nCH_3$ was obtained by processing a mixture of methylal (2 mols), paraformaldehyde (0.5 mol), and $H_2SO_4$ (0.1% by weight) at 100° in a pressure-resistant vessel for 1 hour under a pressure of 100 lbs. per sq. in. Conversions to polyoxymethylene ethers were as follows ($n$ being the number of formaldehyde units in the chain): $n=2$, 41.0%; $n=3$, 20.9%; $n=4$, 6.7%.

*Example 5.*—A mixture of 60% aqueous formaldehyde (1 mol), methylal (4 mols), and $H_2SO_4$ (0.04 mol) was refluxed for three hours. The resulting material was made alkaline, and distilled, giving a conversion of ca. 30% to dimethoxymethyl ether, $CH_3O(CH_2O)_2CH_3$ (B. P., 104° C.).

The above examples are illustrative only and the invention is not limited thereto since many modifications will occur to those skilled in the art. Thus, the high molecular weight polyformals may be recovered and recycled with additional dialkyl formal and acid-reacting catalyst to give improved yields of the desired low molecular weight polyformals. Also when polyformals, such as tri- or tetra(oxymethylene) dialkyl ethers are desired the di(oxymethylene) dialkyl ethers may be recovered and recycled to improve the yield of the desired low molecular weight polyoxymethylene dialkyl ethers.

The products obtained in accordance with the invention, especially the diisobutoxy methyl ether and trioxymethylene diisobutyl ethers, are of value as high-boiling stable solvents.

Since many different embodiments of this invention may be made without departing from the spirit and scope thereof, it will be understood that we do not limit ourselves except as set forth in the following claims.

We claim:

1. A process for the preparation of polyformals which comprises heating a dialkyl formal of the formula, $ROCH_2OR$, in which R is an alkyl group having from 1 to 4 carbon atoms, with formaldehyde at a temperature in the range of about 20° to 150° C. the initial molar ratio of dialkyl formal to formaldehyde being from 1:1 to 10:1 in the presence of an acid-reacting catalyst, continuing the resultant reaction until a reaction mixture approximating equilibrium is obtained, thereupon destroying the said acid reacting catalyst by addition of alkali and distilling from the reaction product polyformals of the formula, $$RO(CH_2O)_nR$$

in which R is an alkyl group having from 1 to 4 carbon atoms and $n$ is an integer from 2 to 4.

2. A process for the preparation of polyformals which comprises heating a dialkyl formal of the formula, $ROCH_2OR$, in which R is an alkyl group having from 1 to 4 carbon atoms, with paraformaldehyde at a temperature of about 80° to 100° C. the initial molar ratio of dialkyl formal to formaldehyde being from 1:1 to 10:1 in the presence of an inorganic acid catalyst, continuing the resultant reaction until a reaction mixture approximating equilibrium is obtained and thereafter destroying the said acid catalyst by addition of alkali and distilling from the reaction product polyformals of the formula, $RO(CH_2O)_nR$, in which R is an alkyl group having from 1 to 4 carbon atoms and $n$ is an integer from 2 to 4.

3. A process for the preparation of polyformals which comprises heating a dialkyl formal of the formula, $ROCH_2OR$, in which R is an alkyl group having from 1 to 4 carbon atoms, with anhydrous formaldehyde, the initial molar ratio of the said dialkyl formal to formaldehyde being between 1:1 and 10:1, at a temperature within the range of 20° to 150° C., in the presence of an inorganic acid catalyst, continuing the resultant reaction until a reaction mixture approximating equilibrium is obtained and thereafter destroying the said acid catayslt by addition of alkali and distilling from the reaction product polyformals of the formula, $RO(CH_2O)_nR$, in which R is an alkyl group having from 1 to 4 carbon atoms and $n$ is an integer from 2 to 4.

4. A process for the preparation of polyformals which comprises heating a dialkyl formal of the formula, $ROCH_2OR$, in which R is an alkyl group having from 1 to 4 carbon atoms, with paraformaldehyde, the initial molar ratio of the said dialkyl formal to formaldehyde being between 1:1 and 10:1, at a temperature within the range of 20° to 150° C. in the presence of not more than about 2% of an inorganic acid catalyst, based on the total weight of the reaction mixture, continuing the resultant reaction until a reaction mixture approximating equilibrium is obtained, and thereafter destroying the said acid catalyst by addition of alkali and distilling from the reaction product polyformal of the formula, $RO(CH_2O)_nR$, in which R is an alkyl group having from 1 to 4 carbon atoms and $n$ is an integer from 2 to 4.

5. A process for the preparation of diisobutoxymethyl ether and tri(oxymethylene) diisobutyl ether which comprises heating for about 2 hours at a temperature of about 80° C. to 100° C. a mixture of about 1.0 mol of diisobutyl formal and about 0.33 mol of substantially anhydrous paraformaldehyde in the presence of about 1% by weight of sulfuric acid, based on the total weight of the reaction mixture, thereafter destroying the said sulfuric acid by making the reaction mixture basic with sodium methoxide and distilling diisobutoxymethyl ether and tri(oxymethylene) diisobutyl ether from the resulting product.

6. A compound of the formula $$i\text{-}C_4H_9O(CH_2O)_2i\text{-}C_4H_9$$

having a boiling point of about 66° C. at a pressure of 5 mm., and a refractive index of about 1.4050 at 25° C.

7. A compound of the formula $$i\text{-}C_4H_9O(CH_2O)_3i\text{-}C_4H_9$$

having a boiling point of about 69° C. at a pressure of 2 mm., and a refractive index of about 1.4082 at 25° C.

8. A compound of the formula $$i\text{-}C_4H_9O(CH_2O)_ni\text{-}C_4H_9$$

in which $n$ represents an integer from 2 to 3 inclusive.

9. A process for preparing polyoxymethylene dialkyl ethers of the formula $CH_3O(CH_2O)_nCH_3$, $n$ being an integer from 2 to 4, which comprises heating methylal with formaldehyde at a temperature of about 20° to 150° C. in the presence of an acidic catalyst, the initial mol ratio of methylal to formaldehyde being from 1:1 to 10:1, continuing the resultant reaction until a reaction mixture approximating equilibrium is obtained, thereupon destroying the said acidic catalyst by addition of alkali, and distilling from the resultant product an ether of the formula $CH_3O(CH_2O)_nCH_3$.

10. A process for preparing polyoxymethylene dialkyl ethers of the formula $$C_2H_5O(CH_2O)_nC_2H_5,$$

$n$ being an integer from 2 to 4, which comprises heating methylal with formaldehyde at a temperature of about 20° to 150° C. in the presence of an acidic catalyst, the initial mol ratio of methylal to formaldehyde being from 1:1 to 10:1, continuing the resultant reaction until a reaction mixture approximating equilibrium is obtained, thereupon destroying the said acidic catalyst by addition of alkali, and distilling from the resultant product an ether of the formula $$C_2H_5O(CH_2O)_nC_2H_5.$$

WILLIAM F. GRESHAM.
RICHARD E. BROOKS.

REFERENCES CITED

The following references are of record in the file of this patent:

UNITED STATES PATENTS

| Number | Name | Date |
|---|---|---|
| 2,071,252 | Carothers | Feb. 16, 1937 |
| 2,187,081 | Hodgins | Jan. 16, 1940 |
| 2,201,074 | Britton | May 14, 1940 |
| 2,275,008 | Coffman | Mar. 3, 1942 |
| 2,321,557 | Sussman | June 8, 1943 |

OTHER REFERENCES

Beilstein, "Handbuch der Organischen Chemie," 4th Ed. vol. 1, page 576.

Staudinger et al., "Annalen der Chemie," vol. 474, pages 205–216 and 230.

Walker, "Formaldehyde" (1944) page 139, Rheinhold, N. Y.

Descude, "Compte Rendus," vol. 38, (1904) pages 1703–05.